(12) United States Patent
Xiong et al.

(10) Patent No.: US 10,714,114 B2
(45) Date of Patent: Jul. 14, 2020

(54) NOISE REDUCTION METHOD, SYSTEM AND TERMINAL DEVICE

(71) Applicant: UBTECH Robotics Corp, Shenzhen (CN)

(72) Inventors: Youjun Xiong, Shenzhen (CN); Haoming Li, Shenzhen (CN); Pinxiu Wen, Shenzhen (CN); Yanhui Xia, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 35 days.

(21) Appl. No.: 15/969,755

(22) Filed: May 2, 2018

(65) Prior Publication Data
US 2019/0156848 A1 May 23, 2019

(30) Foreign Application Priority Data
Nov. 23, 2017 (CN) .......................... 2017 1 1181746

(51) Int. Cl.
G10L 21/00 (2013.01)
A61F 11/06 (2006.01)
H04R 3/00 (2006.01)
G10L 21/0208 (2013.01)
(Continued)

(52) U.S. Cl.
CPC ......... G10L 21/0208 (2013.01); B25J 13/003 (2013.01); *G10L 2021/02166* (2013.01)

(58) Field of Classification Search
CPC ........ B25J 5/007; B25J 13/003; B25J 9/0003; B25J 9/1602; B25J 13/088; B25J 9/1664; B25J 9/1694; B25J 11/0005; B25J 11/0015; G05D 2201/0214; G05D 1/0088; G05D 2201/0217; G10L 15/22; G10L 2015/223; G10L 2021/02166; G10L 21/0208; H04R 3/005; H04R 1/406; H04R 29/005; H04R 2430/20; H04R 2420/07; H04R 2430/21; H04R 5/027; H04R 2201/40; H04R 2225/61; H04R 2410/01; H04R 1/1083; H04R 2430/23; H04R 1/32
USPC .... 700/245, 258, 253; 381/122, 356, 91, 92, 381/71.6, 17, 26, 313, 332, 56, 58, 71.11; 901/1, 16, 50; 704/205, 500, 201, 211, 704/226, 233, 258, 27
See application file for complete search history.

(56) References Cited

U.S. PATENT DOCUMENTS 8,606,571 B1 * 12/2013 Every ................. G10L 21/0232
375/285
2002/0181723 A1 * 12/2002 Kataoka ................. B25J 13/003
381/92

(Continued)

*Primary Examiner* — Ahmad F. Matar
*Assistant Examiner* — Kharye Pope

(57) ABSTRACT

The present disclosure provides a noise reduction processing method, system and terminal device. In the present disclosure, a position angle of a far-field audio input sound source and a microphone array as well as a rotation angle of a head servo of a robot are obtained, and then a target rotation angle of the robot is calculated. The head servo of the robot is controlled to rotate according to the target rotation angle such that the robot moves along with the far-field sound source, and a beam area is changed according to the target rotation angle to enable a sound source enhancement area to process far-field audios. As a result, the noise reduction performance of the microphone array beam is effectively improved.

9 Claims, 9 Drawing Sheets

(51) Int. Cl.
*B25J 13/00* (2006.01)
*G10L 21/0216* (2013.01)

(56) References Cited

U.S. PATENT DOCUMENTS

| | | | |
|---|---|---|---|
| 2003/0139851 A1* | 7/2003 | Nakadai | G10L 21/0208 700/258 |
| 2007/0192910 A1* | 8/2007 | Vu | B25J 5/007 700/245 |
| 2007/0291968 A1* | 12/2007 | Joublin | G01S 3/8055 381/309 |
| 2010/0329479 A1* | 12/2010 | Nakadai | B25J 9/00 381/92 |
| 2015/0172807 A1* | 6/2015 | Olsson | G10K 11/175 381/74 |
| 2017/0225321 A1* | 8/2017 | Deyle | G08B 13/19647 |
| 2018/0176680 A1* | 6/2018 | Knight | H04R 1/406 |
| 2018/0374494 A1* | 12/2018 | Yamaya | G10L 21/028 |
| 2019/0126157 A1* | 5/2019 | Hayashi | A63H 11/00 |

* cited by examiner

NOISE REDUCTION METHOD, SYSTEM AND TERMINAL DEVICE

CROSS REFERENCE TO RELATED APPLICATIONS

This application claims priority to Chinese Patent Application No. 201711181746.7, filed Nov. 23, 2017, which is hereby incorporated by reference herein as if set forth in its entirety.

BACKGROUND

1. Technical Field

The present disclosure relates to audio processing technology, and particularly to a noise reduction method, system and terminal device.

2. Description of Related Art

A microphone army of a robot is an array combination composed of a plurality of microphones. A physical model which can adjust the signal-to-noise ratio of audio signals, that is, a beam, is formed through the microphone array. The four beam areas formed by the microphone array of the robot are capable of performing noise reduction to inputted far-field audios. The microphone array beam noise reduction module and the servo driving module of the head of the robot are two functional modules which operate independently. Since the microphone army is installed on the head of the robot, the initial beam forming area of the microphone array will fee changed when the head of the robot is driven to move, which affects the noise reduction effect of the microphone array on the far-field audios.

In summary, in the prior art, the performance of the noise reduction of the beam of the microphone array will be affected when the head of the robot is controlled to move.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following description, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

In order to solve the problem in the prior art that the performance of the noise reduction of the beam of the microphone array is affected when a head of the robot is controlled to move, a noise reduction method, system and terminal device are provided. In the present disclosure, a position angle of a far-field audio input sound source and a microphone array as well as a rotation angle of a head servo of the robot are obtained, and then a target rotation angle of the robot is calculated. The head servo of the robot is controlled to rotate according to the target rotation angle such that the robot moves along with the far-field sound source, and a beam area is changed according to the target rotation angle to enable a sound source enhancement area to process far-field audios. As a result, the noise reduction performance of the microphone array beam is effectively improved, which resolves the problem in the prior art that the performance of the noise reduction of the beam of the microphone array is affected when the head of the robot is controlled to move (e.g., rotate).

For the purpose of describing the technical solutions of the present disclosure, the following describes through specific embodiments.

Embodiment One

Figure 1:
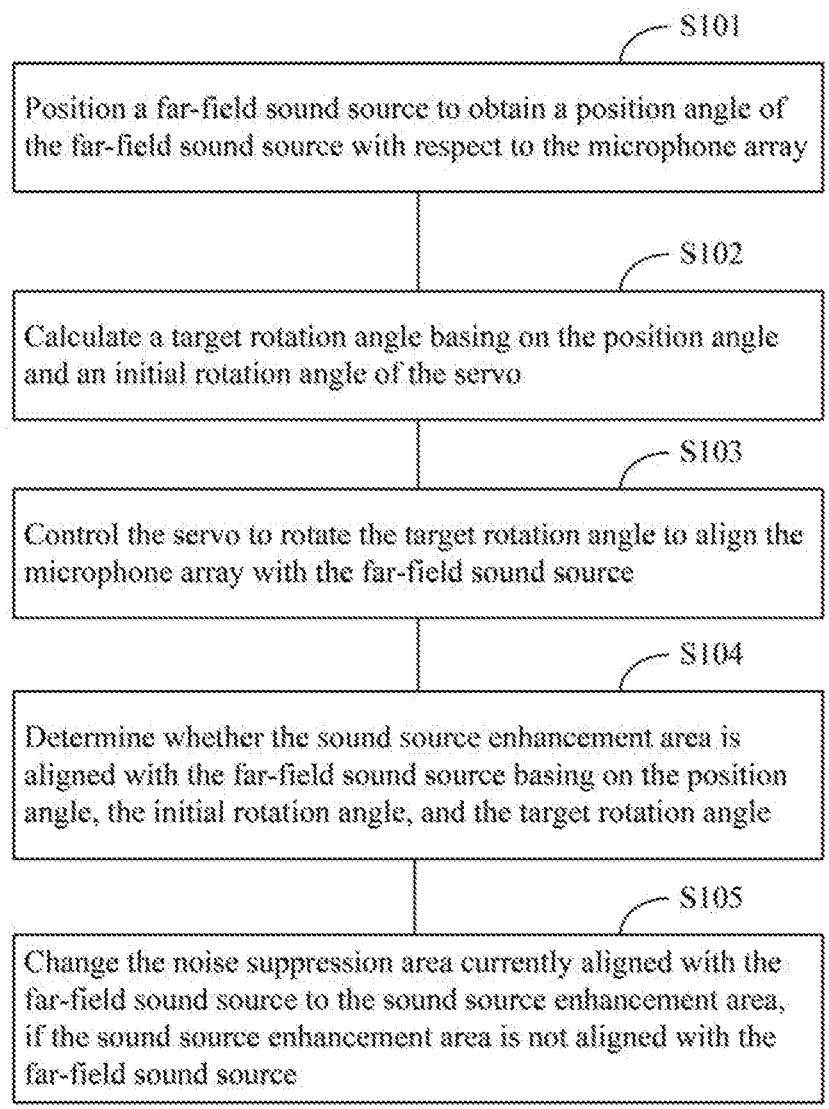
FIG. 1 is a flow chart of a noise reduction method according to a first embodiment of the present disclosure.

FIG. 1 is a flow chart of a noise reduction method according to a first embodiment of the present disclosure. The noise reduction method provided by this embodiment is applied to a robot. The robot has a head and a servo for controlling the head to rotate. The head is provided with a microphone array, in which the microphone array has a noise suppression area and a sound source enhancement area. In this embodiment, the method is a computer-implemented method executable for a processor. The method can be applied to terminal devices such as cell phones, tablet computers, notebook computers, and cloud servers. As shown in FIG. 1 the method includes the following steps.

S101: positioning a far-field sound source to obtain a position angle of the far-field sound source with respect to the microphone array.

In a specific application, when there is the far-field sound source input, the microphone array positions the far-field sound source to obtain the position angle of the far-field sound source with respect to the above-mentioned microphone array. Specifically, the position angle refers to an angle of the above-mentioned far-field sound source with respect to a certain fixed position of the above-mentioned microphone array.

Figure 2:
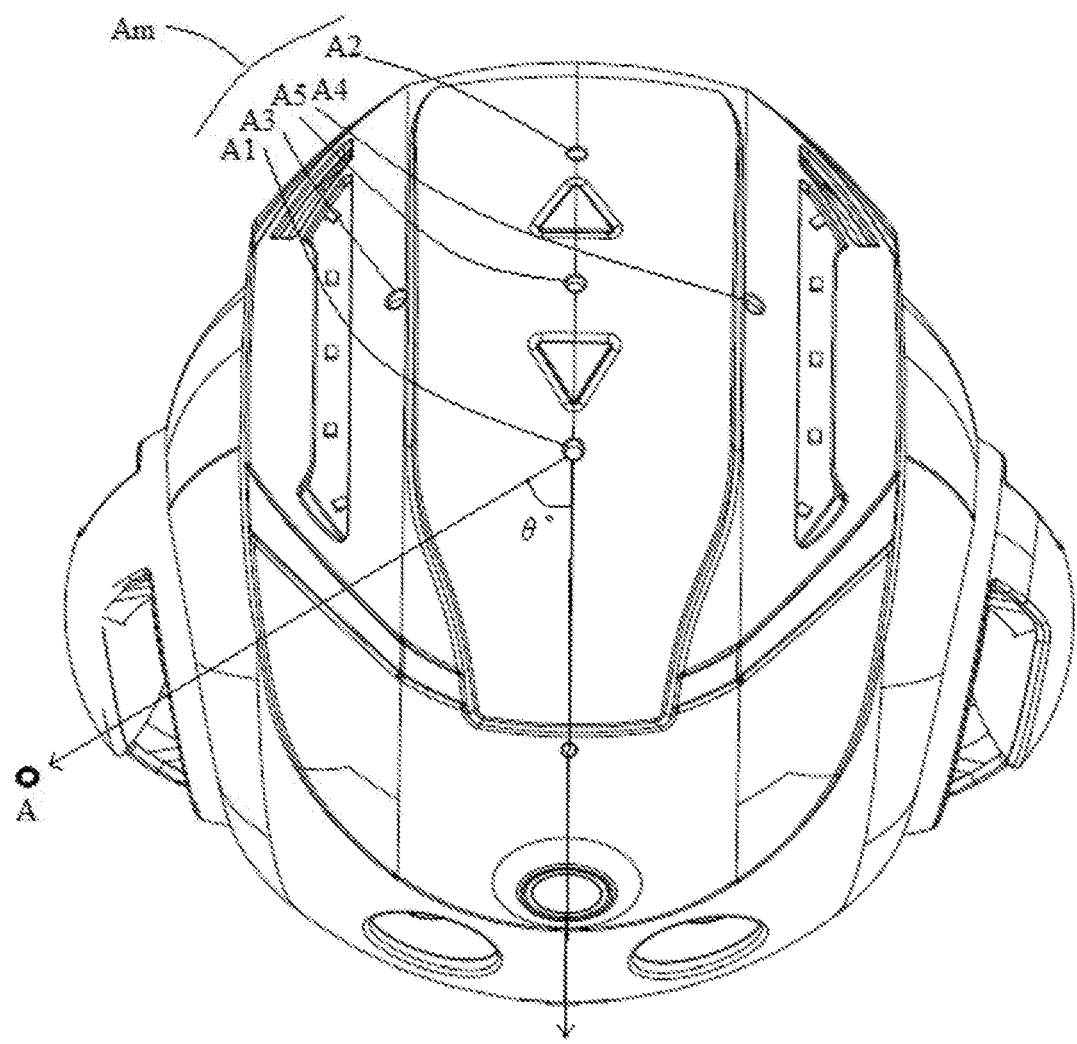
FIG. 2 is a top view of an exemplary robot head with a microphone array-showing the relative position of the microphone array and the robot head in the first embodiment of the present disclosure.
Figure 3:
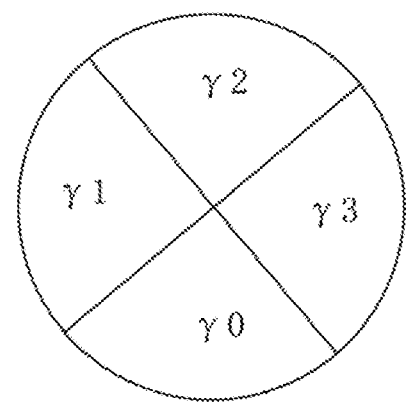
FIG. 3 is a schematic diagram of the distribution of the noise suppression area and the sound source enhancement area of the microphone army in the first embodiment of the present disclosure.

FIG. 2 is a top view of an exemplary robot head with a microphone array showing the relative position of the microphone array and the robot head in the first embodiment of the present disclosure. As an example, as shown in FIG. 2, the microphone array Am is located at a center of a top of the head of the robot. The microphone array Am includes a front microphone A1, a rear microphone A2, a left microphone A3, a right microphone A4, and a middle microphone A5. When the far-field sound source A is inputted, the microphone array Am will form a plurality of beam areas. The beam areas each configured as the noise suppression area or the sound source enhancement area according to the relative position with respect to the far-field sound source A. In a specific application, the beam area(s) that are aligned with (aimed at) the far-field sound source A is configured as the sound source enhancement area, the other beam area(s) that are not aligned with the far-field: sound source A are configured as the noise suppression area. The far-field sound source A is collected in a strengthened manner through the sound source enhanced area, and the noise of the surroundings is suppressed to reduce through the noise suppression area. It should be noted that there are at least two of the above-mentioned plurality of beam areas. Exemplarily, as shown in FIG. 3, the microphone array forms four beam areas, in which the beam areas are fan-shaped areas. If point A is a far-field sound source, the first beam area γ0 is configured as the sound source enhancement area, and the second beam area γ1, the third beam area γ2, and the fourth beam area γ3 are configured as the noise suppression areas. It should be noted that, in this embodiment, the alignment of the far-field sound source A may be an alignment without angle deviation or may be an alignment meeting a certain deviation angle, where the beam area is regarded as being aligned with the far-field sound source A as long as the beams emitted by the beam area can act on the far-field sound source A.

S102: calculating a target, rotation angle basing on the position angle and an initial rotation angle of the servo.

In a specific application, the initial rotation angle of the servo may be obtained by transmitting a servo angle readback instruction to the servo, or be obtained by other methods, which is not limited herein.

In a specific application, as shown in FIG. 2, the position angle is an angle θ" between the microphone array (in the embodiment, it is the front microphone A1) to the far-field sound source A and the robot front when the far-field sound source A is inputted. The initial angle of the servo is the rotation angle of the servo which is with respect to the initial position of the servo when the far-field sound source A is inputted. In order to make the head of the robot to follow the far-field sound source A, there's a necessary to control the servo to rotate. The target rotation angle can fee calculated through the position angle and the initial rotation angle of the servo.

S103: controlling the servo to rotate the target rotation angle to align the microphone array with the far-field sound source.

In a specific application, after the target rotation angle is calculated, the servo is controlled to rotate the target rotation angle, that is, the head of the robot is controlled to align with (aim at) the far-field sound source, such that the microphone array is aligned with the far-field sound source.

S104: determining whether the sound source enhancement area is aligned with the far-field sound source basing on the position angle, the initial rotation angle, and the target rotation angle.

In a specific application, since the microphone array is located on the head of the robot, the position of the original beam area will be changed when the head of the robot rotates. In this ease, it needs to determine whether the beam area aligned with the far-field sound source is still the sound source enhancement area. If the beam area aligned with the far-field sound source is still the sound source enhancement area, it is not necessary to change the beam area; otherwise, the noise suppression area currently aligned with the far-field sound source needs to be changed as the sound source enhancement area.

S105: changing the noise suppression area currently aligned with the far-field sound source to the sound source enhancement area, if the sound source enhancement area is not aligned with the far-field sound source.

In a specific application, if the sound source enhancement area is not aligned with the far-field sound source, it indicates that the position of the original beam area is changed due to the rotation of the head of the robot so that the noise suppression area is aligned with the far-field sound source, which causes the suppression of the far-field sound source and is disadvantageous in collecting information of the far-field sound solute. Therefore, the noise suppression area(s) currently aligned with the far-field sound source are changed as the sound source enhancement area by changing a suppression ratio of the noise suppression area(s), so as to collect the information of the far-field sound source in a strengthened manner.

In one embodiment, before step S102, the method further includes:

S106: obtaining the initial rotation angle of the servo.

S107: determining whether the position angle and the initial rotation angle meet a first preset condition.

In a specific application, the first preset condition is that the position angle is 0 degrees and the initial rotation angle is 120 degrees. It should be noted that when the position angle is 0 degrees and the initial rotation angle is 120 degrees, it indicates that the current sound source enhancement area is aligned with the far-field sound source, and the head of the robot is also aligned with the far-field sound source, hence it is not necessary to control the head of the robot to rotate.

S108: controlling the sound source enhancement area to emit a beam to act on the far-field sound source, if the position angle and the initial rotation angle meet the first preset condition.

In a specific application, when the position angle and the rotation angle meet a condition that the position angle is 0 degrees and the initial rotation angle is 120 degrees, the far-field sound source may be collected only by emitting beams through the configured sound source enhancement area.

In the noise reduction method of this embodiment, the position angle of the far-field audio input sound source and the microphone array as well as the rotation angle of a head servo of a robot are obtained, and then the target rotation angle of the robot is calculated. The head servo of the robot is controlled to rotate according to the target rotation angle such that the robot moves along with the far-field sound source, and the beam area is changed according to the target rotation angle to enable the sound source enhancement area to process far-field audios. As a result, the noise reduction performance of the microphone array beam is effectively improved, which resolves the problem in the prior art that the performance of the noise reduction of the beam of the microphone array is affected when the head of the robot is controlled to move.

Embodiment Two

Figure 4:
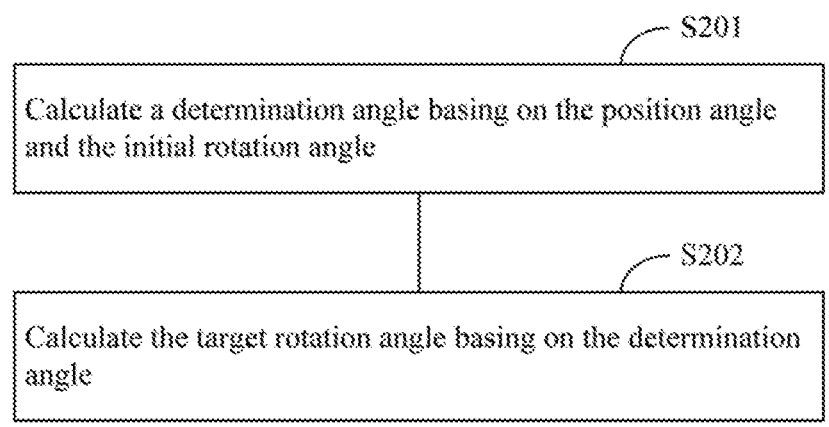
FIG. 4 is a flow chart of aft implementation of step S102 of the first embodiment according to a second embodiment of the present disclosure.

FIG. 4 is a flow chart of an implementation of step S102 of the first embodiment according to a second embodiment of the present disclosure. As shown in FIG. 4, in this embodiment, step S102 in the first embodiment specifically includes:

S201: calculating a determination angle basing on the position angle and the initial rotation angle.

In one embodiment, the above-mentioned step S201 specifically includes the following steps.

S2011: determining whether the position angle meets a second preset condition.

In a specific application, the above-mentioned second preset condition is that the position angle is greater than 0 degrees and less than or equal to 180 degrees. When the position angle is greater than 0 degrees and less than or equal to 180 degrees, it indicates that the far-field sound source is located on the right side of the head of the robot; otherwise, if indicates that the far-field sound source is located on the left side of the head of the robot. It should be noted that the range of the rotation angle of the servo is 75 degrees to 165 degrees.

S2022: setting the determination angle as a sum of the position angle and the initial rotation angle, if the position angle meets the second preset condition.

When the position angle is greater than 0 degrees and less than or equal to 180 degrees, the determination angle is set as the sum of the position angle and the initial rotation angle.

S2023: setting the determination angle as subtracting a group angle of the position angle from the initial rotation angle, if the position angle does not meet the second preset condition.

When the position angle does not meet the second preset condition, it indicates that the position angle is greater than 180 degrees and less than or equal to 360 degrees. In this ease, the determination angle is set as subtracting the group angle of the position angle from the initial rotation angle. It should be noted that two angles are defined as mutual group angles when the sum of the two angles is 360 degrees.

S202: calculating the target rotation angle basins on the determination angle.

After the determination angle is calculated, since the range of the rotation angle is 75 degrees to 165 degrees, it is determined whether the determination angle is greater than 165 degrees when the position angle is greater than 0 degrees and less than or equal to 180 degrees. If yes, the target rotation angle is set to 165 degrees; otherwise, the value of the target rotation angle is set as the value of the determination angle. It is determined whether the determination angle is less than 75 degrees when the position angle is greater than 180 degrees and less than or equal to 360 degrees. If yes, the target rotation angle is set to 75 degrees; otherwise, the value of the target rotation angle is set as the value of the determination angle.

Embodiment Three

Figure 5:
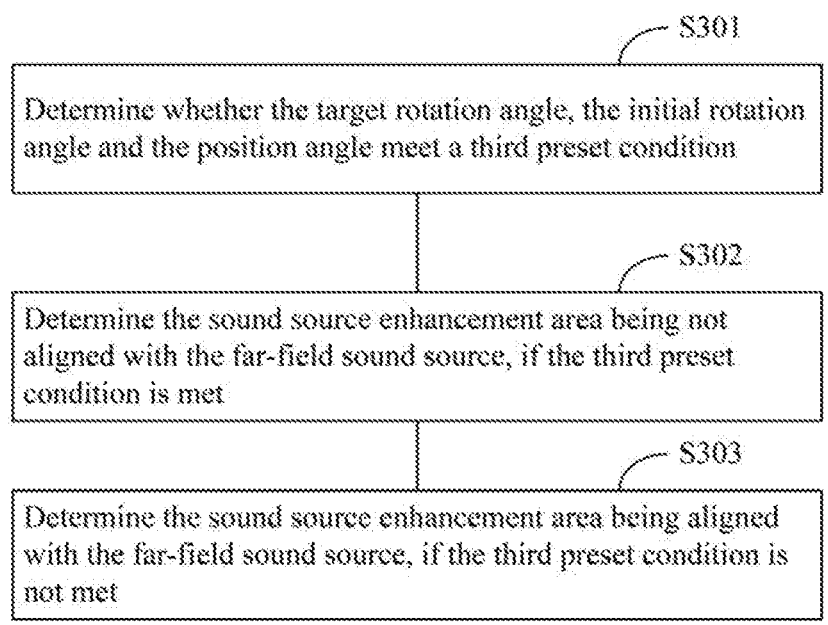
FIG. 5 is a flow chart of an implementation of step S104 of the first embodiment according to a third embodiment of the present disclosure.

FIG. 5 is a flow chart of an implementation of step S104 of the first embodiment according to a third embodiment of the present disclosure As shown in FIG. 5, in this embodiment, step S104 in the first embodiment specifically includes:

S301: determining whether the target rotation angle, the initial rotation angle and the position angle meet a third preset condition.

In a specific application, the third preset condition is that the target rotation angle is not equal to the initial rotation angle. It is determined according to the position angle that whether the beam area currently aligned with the far-field sound source is the sound source enhanced area previously set.

S302: determining the sound source enhancement area being not aligned with the far-field sound source, if the third preset condition is met.

S303: determining the sound source enhancement area being aligned with the far-field sound source, if the third preset condition is not met.

In a specific application, the beam area currently aligned with the far-field sound source may be determined according to the target rotation angle, the initial rotation angle, and the position angle. If the beam area currently aligned with the flu-field sound source is the noise suppression area, the suppression ratio of the area is adjusted to change it to the sound source enhancement area. If the beam area currently aligned with the far-field sound source is the sound source enhancement area, the far-field sound source is collected through the sound source enhancement area.

Embodiment Four

Figure 6:
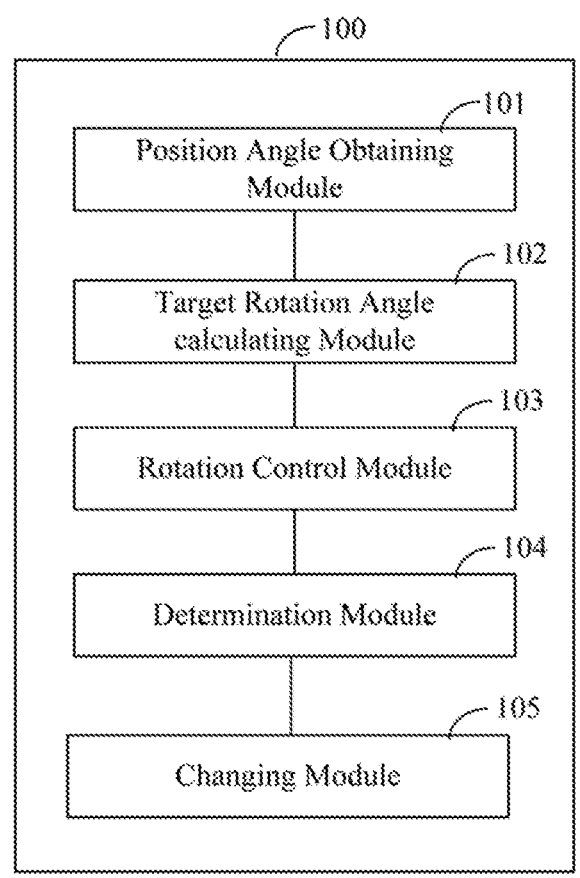
FIG. 6 is a schematic diagram of the structure of a noise reduction system according to a fourth embodiment of the present disclosure.

FIG. 6 is a schematic diagram of the structure of a noise reduction system according to a fourth embodiment of the present disclosure. The noise reduction system provided by this embodiment is applied to a robot. The robot has a head and a servo for controlling the head to rotate. The head is provided with a microphone array, in which the microphone array has a noise suppression area and a sound source enhancement area. As shown in FIG. 6, a noise reduction system 100 is provided to perform the steps in the first embodiment, which includes a processor and a memory storing instructions executable for the processor, wherein the instructions function as:

a position angle obtaining module 101 configured to position a far-field sound source to obtain a position angle of the far-field sound source with respect to the microphone array.

a target rotation angle calculating module 102 configured to calculate a target rotation angle basing on the position angle and an initial rotation angle of the servo;

a rotation control module 103 configured to control the servo to rotate the target rotation angle to align the microphone array with the far-field sound source;

a determination module 104 configured to determine whether the sound source enhancement area is aligned with the far-field sound source basing on the position angle, the initial rotation angle, and the target rotation angle; and a changing module 105 configured to change the noise suppression area currently aligned with the far-field sound source to the sound source enhancement area, if the sound source enhancement area is not aligned with the far-field sound source.

In one embodiment, the instructions of the noise reduction system 100 further function as:

an initial angle obtaining module configured to obtain the initial rotation angle of the servo;

a first condition determining module configured to determine whether the position angle and the initial rotation angle meet a first preset condition; and a processing module configured to control the sound source enhancement area to emit a beam to act on the far-field sound source, if the position angle and the initial rotation angle meet the first preset condition.

It should be noted that, since the noise reduction system provided by this embodiment is based on the same concept with the method embodiment shown in FIG. 1 of the present disclosure, which has the same technical effect as the method embodiment shown in FIG. 1 of the present disclosure. For details, reference may be made to the description in the method embodiment shown in FIG. 1 of the present disclosure, which is not described herein.

Embodiment Five

Figure 7:
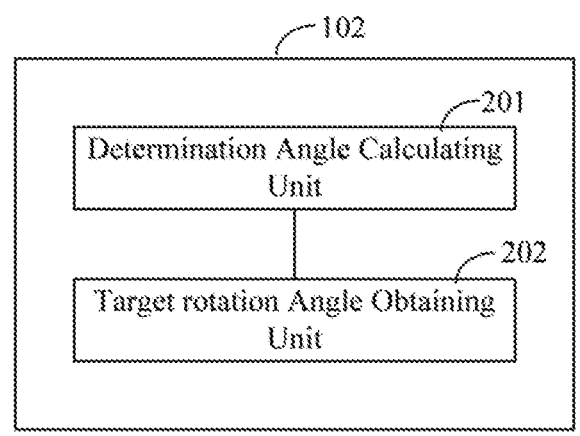
FIG. 7 is a schematic diagram of the structure of the target rotation angle calculation module 102 of the fourth embodiment according to a fifth embodiment of the present disclosure.

FIG. 7 is a schematic diagram of the structure of the target rotation angle calculation module 102 of the fourth embodiment according to a fifth embodiment of the present disclosure. As shown in FIG. 7, in this embodiment, the target rotation angle calculating module 102 in the fourth embodiment includes a structure for executing the method in the embodiment corresponding to FIG. 4. The structure includes:

a determination angle calculating unit 201 configured to calculate a determination angle basing on the position angle and the initial rotation angle; and a target rotation angle obtaining unit 202 configured to calculate the target rotation angle basing on the determination angle.

In one embodiment, the determination angle calculating unit 201 includes:

a second condition determining unit configured to determine whether the position angle meets a second preset condition;

a first calculating unit configured to set the determination angle as a sum of the position angle and the initial rotation angle, if the position angle meets the second preset condition; and a second calculating unit configured to set the determination angle as subtracting a group angle of the position angle from the initial rotation angle, if the position angle does not meet the second preset condition.

Embodiment Six

Figure 8:
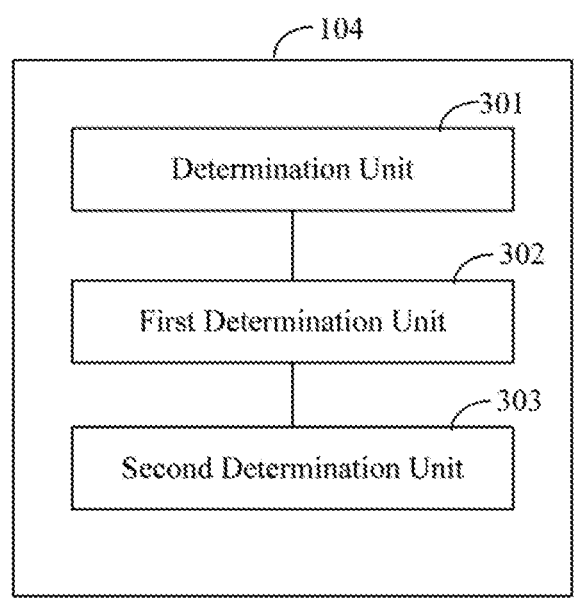
FIG. 8 is a schematic diagram of the structure of the determination module 104 of the fourth embodiment accords rig to a sixth embodiment of the present disclosure.

FIG. 8 is a schematic diagram of the structure of the determination module 104 of the fourth embodiment according to a sixth embodiment of the present disclosure. As shown in FIG. 8, in this embodiment, the determination module 104 in the fourth embodiment includes a structure for executing the method in the embodiment corresponding to FIG. 5. The structure includes:

a determination unit 301 configured to determine whether the target rotation angle, the initial rotation angle and the position angle meet a third preset condition;

a first determination unit 302 configured to determine the sound source enhancement area being not aligned with the far-field sound source, if the third preset condition is met; and a second determination unit 303 configured to determine the sound source enhancement area being aligned with the far-field sound source, if the third preset condition is not met.

Embodiment Seven

Figure 9:
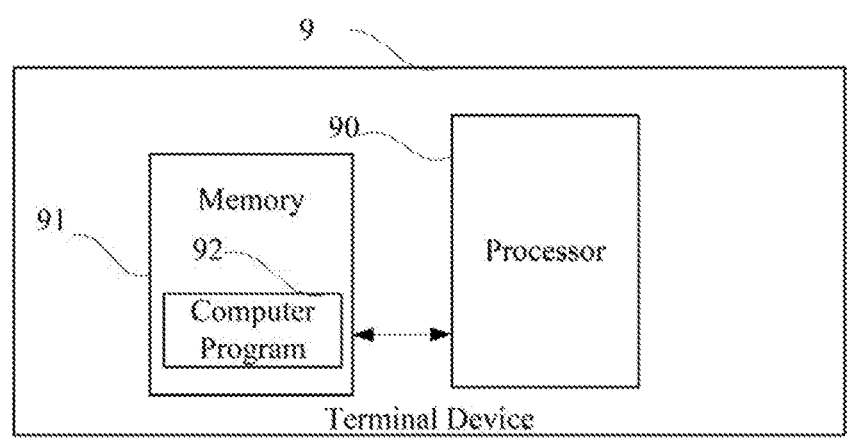
FIG. 9 is a schematic diagram of a terminal device according to a seventh embodiment of the present disclosure.

FIG. 9 is a schematic diagram of a terminal device according to a seventh embodiment of the present disclosure. As shown in FIG. 9, the terminal device 9 of this embodiment includes a processor 90, a memory 91, and a computer program 92 such as a program which is stored in the memory 91 and executable on the processor 90. When the processor 90 executes the computer program 92, the steps in the above-mentioned embodiments of the noise reduction method, for example, steps S101-S105 shown in FIG. 1, are implemented. Alternatively, when the processor 90 executes the computer program 92, functions of each module/unit in the embodiment of the above-mentioned noise reduction system, for example, the functions of the modules 101-105 shown in FIG. 6, are implemented.

Exemplarily, the computer program 92 may be divided into one or more modules/units, and the one or more modules/units are stored in the storage 91 and executed by the processor 90 to realize the present disclosure. The one or more modules/units may be a series of computer program instruction sections capable of performing a specific function, and the instruction sections are for describing the execution process of the computer program 92 in the terminal apparatus 9. For example, the computer program 92 may be divided into a position angle obtaining module, a target rotation angle calculating module, a rotation control module, a determination module, and a changing module. Specific functions of each module are as follows:

the position angle obtaining module is configured to position a far-field sound source to obtain a position angle of the far-field sound source with respect to the microphone array;

the target rotation angle calculating module is configured to calculate a target rotation angle basing on the position angle and an initial rotation angle of the servo;

the rotation control module is configured to control the servo to rotate the target rotation angle to align the microphone array with the far-field sound source;

the determination module is configured to determine whether the sound source enhancement area is aligned with the far-field sound source basing on the position angle, the initial rotation angle, and the target rotation angle; and the changing module is configured to change the noise suppression area currently aligned with the far-field sound source to the sound source enhancement area, if the sound source enhancement area is not aligned with the far-field sound source The terminal device 9 may be a computing device such as a desktop computer, a notebook computer, a tablet computer, and a cloud server. The terminal device 9 may include, but is not limited to, a processor 90 and a storage 91. It can be understood by those skilled in the art that FIG. 9 is merely an example of the terminal device 9 and does not constitute a limitation on the terminal device 9, and may include more or fewer components than those shown in the figure, or a combination of some components or different components. For example, the terminal device 9 may further include an input/output device, a network access device, a bus, and the like.

The processor 90 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 91 may be an internal storage unit of the terminal device 9, for example, a hard disk or a memory of the terminal device 9. The storage 91 may also be an external storage device of the terminal device 9, for example, a plug-in hard disk, a smart media card (SMC), a secure digital (SD) card, flash card, and the like, which is equipped on terminal device 9. Furthermore, the storage 91 may further include both an internal storage unit and an external storage device, of the terminal device 9. The storage 91 is configured to store the computer program and other programs and data required by the terminal device 9. The storage 91 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present application. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interlaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included, within the scope of the present disclosure.

What is claimed is:

1. A computer-implemented noise reduction method for a robot having a head and a servo for controlling the head to rotate, the head being provided with a microphone array having a plurality of microphones located in beam areas on the head each being set as one of a noise suppression area and a sound source enhancement area, the method comprising executing on a processor steps of:
    positioning a far-field sound source to obtain a position angle of the far-field sound source with respect to the microphone array;
    calculating a target rotation angle basing on the position angle and an initial rotation angle of the servo;

controlling the servo to rotate the target rotation angle to align the microphone array with the far-field sound source;
determining whether the sound source enhancement area is aligned with the far-field sound source basing on the position angle, the initial rotation angle, and the target rotation angle; and
changing the noise suppression area currently aligned with the far-field sound source to the sound source enhancement area by changing an audio signal suppression ratio thereof, in response to the sound source enhancement area being not aligned with the far-field sound source;
wherein calculating the target rotation angle basing on the position angle and the initial rotation angle of the servo further comprises:
obtaining the initial rotation angle of the servo;
determining whether the position angle and the initial rotation angle meet a first preset condition; and
controlling the sound source enhancement area to emit a beam to act on the far-field sound source, in response to the position angle and the initial rotation angle meeting the first preset condition; and
wherein the step of calculating the target rotation angle basing on the position angle and the initial rotation angle of the servo comprises:
calculating a determination angle basing on the position angle and the initial rotation angle; and
calculating the target rotation angle basing on the determination angle.

2. The method of claim 1, wherein the step of calculating the determination angle basing on the position angle and the initial rotation angle comprises:
determining whether the position angle meets a second preset condition;
setting the determination angle as a sum of the position angle and the initial rotation angle, in response to the position angle meeting the second preset condition; and
setting the determination angle as subtracting a group angle of the position angle from the initial rotation angle, in response to the position angle not meeting the second preset condition, wherein the group angle of the position angle equals to 360 minus the position angle.

3. The method of claim 1, wherein the step of determining whether the sound source enhancement area is aligned with the far-field sound source basing on the position angle, the initial rotation angle, and the target rotation angle comprises:
determining whether the target rotation angle, the initial rotation angle and the position angle meet a third preset condition;
determining the sound source enhancement area being not aligned with the far-field sound source, in response to the third preset condition being met; and
determining the sound source enhancement area being aligned with the far-field sound source, in response to the third preset condition being not met.

4. A noise reduction system for a robot having a head and a servo for controlling the head to rotate, the head being provided with a microphone array having a plurality of microphones located in beam areas on the head each being set as one of a noise suppression area and a sound source enhancement area, the system comprising a processor and a memory storing one or more computer programs executable for the processor, wherein the one or more computer programs comprises:

a position angle obtaining module configured to position a far-field sound source to obtain a position angle of the far-field sound source with respect to the microphone array;
a target rotation angle calculating module configured to calculate a target rotation angle basing on the position angle and an initial rotation angle of the servo;
a rotation control module configured to control the servo to rotate the target rotation angle to align the microphone array with the far-field sound source;
a determination module configured to determine whether the sound source enhancement area is aligned with the far-field sound source basing on the position angle, the initial rotation angle, and the target rotation angle; and
a changing module configured to change the noise suppression area currently aligned with the far-field sound source to the sound source enhancement area by changing an audio signal suppression ratio thereof, in response to the sound source enhancement area being not aligned with the far-field sound source;
wherein the target rotation angle calculating module comprises:
an initial angle obtaining module configured to obtain the initial rotation angle of the servo;
a first condition determining module configured to determine whether the position angle and the initial rotation angle meet a first preset condition; and
a processing module configured to control the sound source enhancement area to emit a beam to act on the far-field sound source, in response to the position angle and the initial rotation angle meeting the first preset condition; and
wherein the target rotation angle calculating module comprises:
a determination angle calculating unit configured to calculate a determination angle basing on the position angle and the initial rotation angle; and
a target rotation angle obtaining unit configured to calculate the target rotation angle basing on the determination angle.

5. The system of claim 4, wherein the determination angle calculating unit comprises:
a second condition determining unit configured to determine whether the position angle meets a second preset condition;
a first calculating unit configured to set the determination angle as a sum of the position angle and the initial rotation angle, in response to the position angle meeting the second preset condition; and
a second calculating unit configured to set the determination angle as subtracting a group angle of the position angle from the initial rotation angle, in response to the position angle not meeting the second preset condition, wherein the group angle of the position angle equals to 360 minus the position angle.

6. The system of claim 4, wherein the determination module comprises:
a determination unit configured to determine whether the target rotation angle, the initial rotation angle and the position angle meet a third preset condition;
a first determination unit configured to determine the sound source enhancement area being not aligned with the far-field sound source, in response to the third preset condition being met; and a second determination unit configured to determine the sound source enhancement area being aligned with the far-field sound source, in response to the third preset condition being not met.

7. A terminal device for noise reduction, comprising:
a head comprising a microphone array having a plurality of microphones located in beam areas on the head each being set as one of a noise suppression area and a sound source enhancement area;
a servo for controlling the head to rotate;
one or more processors;
a memory; and
one or more programs, wherein the one or more programs are stored in the memory and configured to be executed by the one or more processors, the one or more programs comprises:
instructions for positioning a far-field sound source to obtain a position angle of the far-field sound source with respect to the microphone array;
instructions for calculating a target rotation angle basing on the position angle and an initial rotation angle of the servo;
instructions for controlling the servo to rotate the target rotation angle to align the microphone array with the far-field sound source;
instructions for determining whether the sound source enhancement area is aligned with the far-field sound source basing on the position angle, the initial rotation angle, and the target rotation angle; and
instructions for changing the noise suppression area currently aligned with the far-field sound source to the sound source enhancement area by changing an audio signal suppression ratio thereof, in response to the sound source enhancement area being not aligned with the far-field sound source;
wherein the one or more programs further comprises:
instructions for obtaining the initial rotation angle of the servo;
instructions for determining whether the position angle and the initial rotation angle meet a first preset condition; and
instructions for controlling the sound source enhancement area to emit a beam to act on the far-field sound source, in response to the position angle and the initial rotation angle meeting the first preset condition; and
wherein the one or more programs further comprises:
instructions for calculating a determination angle basing on the position angle and the initial rotation angle; and
instructions for calculating the target rotation angle basing on the determination angle.

8. The terminal device of claim 7, wherein the instructions for calculating the determination angle basing on the position angle and the initial rotation angle comprises:
instructions for determining whether the position angle meets a second preset condition;
instructions for setting the determination angle as a sum of the position angle and the initial rotation angle, in response to the position angle meeting the second preset condition; and
instructions for setting the determination angle as subtracting a group angle of the position angle from the initial rotation angle, in response to the position angle not meeting the second preset condition, wherein the group angle of the position angle equals to 360 minus the position angle.

9. The terminal device of claim 7, wherein the one or more programs further comprises:
instructions for determining whether the target rotation angle, the initial rotation angle and the position angle meet a third preset condition;
instructions for determining the sound source enhancement area being not aligned with the far-field sound source, in response to the third preset condition being met; and
instructions for determining the sound source enhancement area being aligned with the far-field sound source, in response to the third preset condition being not met.

* * * * *